Sept. 16, 1930.  R. RICHTER  1,775,916

OPTICAL SYSTEM FOR POLARISTROBOMETERS

Filed Oct. 23, 1928

Inventor:
Robert Richter

Patented Sept. 16, 1930

1,775,916

UNITED STATES PATENT OFFICE

ROBERT RICHTER, OF JENA, GERMANY, ASSIGNOR TO THE FIRM OF CARL ZEISS, OF JENA, GERMANY

OPTICAL SYSTEM FOR POLARISTROBOMETERS

Application filed October 23, 1928, Serial No. 314,514, and in Germany June 28, 1926.

The present invention relates to optical systems for instruments designed to measure the rotation of the plane of polarization of light in traversing any substance, and which contain a polarizer, a light-filter, a half-shadow contrivance disposed in the rear of the polarizer and of the light-filter, an analyser, and a telescope focussed on the half-shadow contrivance.

According to the present invention the half-shadow contrivance consists of so-called Laurent plates in such an arrangement that the field of view of the telescope is divided into three parts two adjoining ones of which generally show a difference in brightness. The Laurent plates known for turning the polarized light about a certain angle, are thin quartz plates, the crystal axes of which lie parallel to the plane of the plate and decline towards the oscillation plane of the light entering the half-shadow contrivance, and the thicknesses of which are equal to the 0.0182th part of an uneven number of wave lengths of this monochromatic light. An arrangement according to the present invention is effected, for example, if the aperture of the diaphragm of the field of view is covered from two sides by quartz plates of the aforementioned kind, in such manner that a strip of space remains open between the two plates. The half-shadow contrivance dealt with in the present invention can be simplified in particular in that a single quartz plate is employed which passes through the centre of the field of view, and the width of which is as large as to cover about one third of the diameter of the field of view. Despite a three-component field of vision being obtained thereby, the entire half-shadow contrivance then only consists of one quartz plate of very small dimensions, so that the half-shadow contrivance no longer affects the price of the instrument to any considerable extent, as had been the case heretofore.

Figure 1:
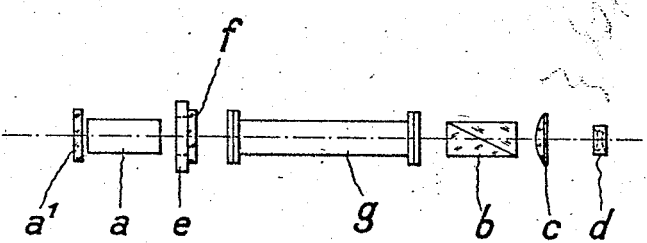
Figures 2, 3:
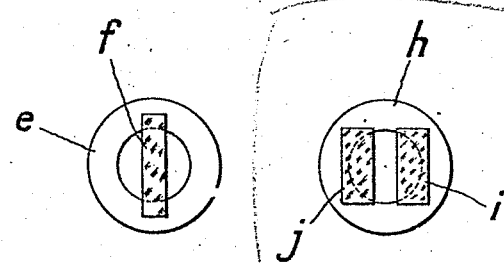

In Fig. 1 and Fig. 2 of the annexed drawing a constructional example is shown of an optical system, according to the present invention, only having a single narrow quartz plate in the field of view. Fig. 1 is an elevation view of the system, and Fig. 2 a view upon the diaphragm of the field of view. Fig. 3 of the drawing represents a view on the diaphragm of the field of view of a constructional example with two quartz plates.

The optical system shown in Figs. 1 and 2 contains a polarizer $a$, in front of which is arranged a yellow filter $a'$, an analyser $b$, a Galilean telescope consisting of two lenses $c$ and $d$, a stop $e$ (limiting the field of view) upon which is cemented a narrow quartz plate of the aforementioned kind. Between the stop $e$ and the analyser $b$ a glass tube is provided to take the substance to be examined, such as a solution of sugar.

The optical system shown in Fig. 3 differs from the above described one in that there are cemented on stop $h$ two quartz plates $i$ and $j$ in place of the single one marked "$f$" in the aforegoing description.

In both kinds of the constructional examples there appear in the field of view of the instrument two outer fields of either the same or almost the same brightness which generally differs from the brightness of the inner field lying between the two outer fields. It is only in the case of a certain and clearly defined position of the analyser, depending upon the kind and concentration of the substance under examination, that all of the three fields appear of the same brightness, so that a conclusion can be drawn from the analyser's position, when all three fields are of a uniform brightness, as to the extent of the concentration of the sugar solution introduced into the glass tube $g$.

I claim:

1. An optical system for an instrument designed to measure the rotation of the plane of polarization of light in traversing any substance, containing a polarizer, a light-filter, an analyser disposed in the rear of the polarizer and of the light-filter, a telescope disposed in the rear of the analyser, and a thin quartz plate disposed in the rear of the polarizer and of the light-filter and in front of the analyser, the crystal axis of which quartz plate lies parallel to the plane of the plate and the position of which declines towards the oscillation plane of the light entering the quartz plate, the thickness of the plate being equal to the 0.0182th part of an uneven number of wavelengths of this light, and the quartz plate being arranged in such a way that the telescope's field of view is divided into three parts.

2. In an optical system according to claim 1 the quartz plate consisting of two parts lying parallel to each other on the sides of the field of view, the width of these two parts being equal to about one third of the diameter of the field of view of the telescope.

ROBERT RICHTER.